US006865184B2

(12) United States Patent
Thubert et al.

(10) Patent No.: US 6,865,184 B2
(45) Date of Patent: Mar. 8, 2005

(54) ARRANGEMENT FOR TRAVERSING AN IPV4 NETWORK BY IPV6 MOBILE NODES

(75) Inventors: Pascal Thubert, La Colle sur Loup (FR); Marco Molteni, Antibes (FR); Patrick Wetterwald, Cagnes sur Mer (FR); Ole Troan, Redhill (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/446,191

(22) Filed: May 28, 2003

(65) Prior Publication Data

US 2004/0179536 A1 Sep. 16, 2004

Related U.S. Application Data

(63) Continuation-in-part of application No. 10/383,567, filed on Mar. 10, 2003.

(51) Int. Cl.[7] .............................................. H04L 12/28
(52) U.S. Cl. ...................................... 370/401; 370/466
(58) Field of Search ................................ 370/328, 329, 370/338, 352, 395.5, 395.52, 400, 401, 465, 466; 709/227, 245

(56) References Cited

U.S. PATENT DOCUMENTS 6,172,986 B1 * 1/2001 Watanuki et al. ........... 370/466

OTHER PUBLICATIONS

Perkins et al, Mobility Support in IPv6, ACM, pp. 27–37, 1996.*
Karagiannis, Mobile IP—State of the Art Report, Ericsson, pp. 1–63, 1999.*
Johnson et al., "Mobility Support in IPv6", Internet Draft, IETF Mobile IP Working Group, draft–ietf–mobileip–ipv6–20.txt, Jan. 20, 2003.
Deering et al., "Internet Protocol, Version 6 (IPv6)", Request for Comments: 2460, IETF Network Working Group, Specification, Dec. 1998.
Huitema, "Teredo: Tunneling IPv6 over UDP through NAT's", IETF Internet Draft, draft–ietf–ngtrans–shipworm–08.txt, Sep. 17, 2002.
Carpenter et al., "Connection of IPv6 Domains via IPv4 Clouds", IETF Network Working Group, Request for Comments: 3056, Feb. 2001.
Thubert et al., "IPv6 Reverse Routing Header and its application to Mobile Networks", IETF Network Working Group, Internet–Draft, draft–thubert–nemo–reverse–routing–header–01, Oct. 11, 2002
Thubert et al., "IPv6 Reverse Routing Header and its application to Mobile Networks", IETF Network Working Group, Internet–Draft, draft–thubert–nemo–reverse–routing–header–00, Jun. 19, 2002.

* cited by examiner

Primary Examiner—Frank Duong
(74) Attorney, Agent, or Firm—Leon R. Turkevich

(57) ABSTRACT

A source IPv6 mobile node is configured for forwarding an IPv6 packet via an IPv4 connection with a destination IPv6 router. The IPv4 packet includes IPv4 source and destination addresses, a UDP source port and UDP destination port, and a synthetic tag address in the IPv6 destination address field. The synthetic tag address, a valid (routable) IPv6 care of address, has an address prefix routed to the IPv6 router. The address prefix specifies a forwarding protocol, the IPv4 destination address for the IPv6 router, and a site-level aggregation identifier. An address suffix for the synthetic tag address specifies the IPv4 source address, the UDP source port and UDP destination port. Hence, the synthetic tag address enables the destination IPv6 router to send an IPv6 reply packet back to the source IPv6 mobile node via the IPv4 network.

54 Claims, 7 Drawing Sheets

Figure 3A

| Protocol ID | Door IPv4 Addr (Pub) | SLA | Door UDP Port | MN Prv. Addr. (IPv4) | MN Prv. Port (UDP) |
|---|---|---|---|---|---|
| 2002 | d200:0202 | 0801 | 0162 | 0a 01: 0102 | 0001 |

30, CoA; 32, 36, 42, 40, 34, 38

Figure 3B

| Protocol ID | Door IPv4 Addr (Pub) | SLA | Door UDP Port | MN Prv. IPv4 Addr. | MN Pub. Port (UDP) |
|---|---|---|---|---|---|
| 2002 | d200:0202 | 0801 | 0162 | 4258: 0102 | 0002 |

| Protocol ID | Door IPv4 Addr (Prv) | SLA | Door UDP Port (Prv) | MN Pub. IPv4 Addr | MN Pub Port (UDP) |
|---|---|---|---|---|---|
| 2002 | 0b 02:0201 | 0801 | 0003 | 4258:0102 | 0002 |

30"; 32, 103, 42, 105, 102, 104

ARRANGEMENT FOR TRAVERSING AN IPV4 NETWORK BY IPV6 MOBILE NODES

CROSS REFERENCE TO RELATED APPLICATIONS

This application is a continuation-in-part of commonly-assigned, copending application Ser. No. 10/383,567, filed Mar. 10, 2003, the disclosure of which is incorporated in its entirety herein by reference.

BACKGROUND OF THE INVENTION

1. Field of the Invention

The present invention relates to transport of Internet Protocol Version 6 (IPv6) packets by IPv6 nodes via an IPv4 network having a Network Address Translator (NAT) or a Port Address Translator (PAT).

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has two working groups focusing on mobile networks, a Mobile Ad-hoc Networks (MANET) Working Group that is working to develop standardized MANET routing specification(s) for adoption by the IETF, and NEMO (mobile networks). NEMO uses Mobile IP (MIP) to provide connectivity between mobile networks and the infrastructure (e.g., the Internet). The key component in NEMO is a mobile router that handles MIP on behalf of the mobile networks that it serves.

A "Mobile IPv6" protocol is disclosed in an Internet Draft by Johnson et al., entitled "Mobility Support in IPv6", available on the World Wide Web at the address: "http://www.ietf.org/internet-drafts/draft-ietf-mobileip-ipv6-21.txt" (the disclosure of which is incorporated in its entirety herein by reference). According to Johnson et al., the Mobile IPv6 protocol enables a mobile node to move from one link to another without changing the mobile node's IP address. In particular, the mobile node is assigned a "home address". The "home address" is an IP address assigned to the mobile node within its home subnet prefix on its home link. While a mobile node is at home, packets addressed to its home address are routed to the mobile node's home link, using conventional Internet routing mechanisms.

The mobile node also is assigned a home agent for registering any care-of address used by the mobile node at its point of attachment to the Internet while the mobile node is away from its home link. A care-of address is an IP address associated with a mobile node that has the subnet prefix of a particular link away from its home link (i.e., a foreign link). A home agent is a router on a mobile node's home link with which the mobile node has registered its current care-of address. While the mobile node is away from its home link, the home agent intercepts packets on the home link destined to the mobile node's home address; the home agent encapsulates the packets, and tunnels the packets to the mobile node's registered care-of address.

Hence, a mobile node is always addressable by its "home address": packets may be routed to the mobile node using this address regardless of the mobile node's current point of attachment to the Internet. The mobile node also may continue to communicate with other nodes (stationary or mobile) after moving to a new link. The movement of a mobile node away from its home link is thus transparent to transport and higher-layer protocols and applications.

Proposals are underway by the Next Generation Transition (NGTRANS) Working Group of the Internet Engineering Task Force (IETF) to enable network nodes to transmit IP packets, generated according to IPv6 protocol as specified by the Request for Comments (RFC) 2460, across an IPv4 network. In particular, RFC 3056 proposes an interim solution (referred to herein as "the 6to4 proposal") of sending IPv6 packets as payload for IPv4 packets, where an interim unique IPv6 address prefix is assigned to any node that has at least one globally unique IPv4 address. These RFCs are available at the IETF website on the World Wide Web at "http://www.ietf.org," and these RFCs 2460 and 3056 are incorporated in their entirety herein by reference.

The 6to4 proposal specifies that an IPv6 node has an IPv6 address that contains an assigned IPv4 address, resulting in an automatic mapping between the IPv6 and IPv4 addresses. Hence, the IPv6 node can easily encapsulate the IPv6 packet with an IPv4 header based on extracting the assigned IPv4 address from within its IPv6 address. In particular, RFC 3056 specifies that the Internet Assigned Numbers Authority (IANA) has permanently assigned one 13-bit IPv6 Top Level Aggregator (TLA) identifier under the IPv6 Format Prefix "001" for the 6to4 proposal: the numeric value of the TLA is 0x00002, i.e., it has a value of 2002::/16 when expressed as a 16-bit IPv6 address prefix. Hence, a 48-bit address prefix is created by the format prefix "001", followed by the 13-bit TLA "0x00002", followed by the assigned 32-bit IPv4 address; the remaining 80 bits of the 128-bit IPv6 address are available for a 16-bit Site-Level Aggregation Identifier (SLA ID), and a 64-bit Interface ID. Consequently, any node having at least one globally unique IPv4 address can have a globally unique IPv6 address, even if the node is combined with an IPv4 Network Address Translator (NAT).

Concerns arise in the event that an IPv6 node is coupled to a private IPv4 network having a Network Address Translator (NAT). NATs perform a Layer-3 translation of IP-Addresses, so that public Internet addresses map to private IP addresses, as described in detail by the Request for Comments 1918 (RFC 1918). This mapping has allowed enterprises to map a large number of private addresses to a limited number of public addresses, thus limiting the number of public addresses required by Internet users.

As described in RFC 3056, however, if an IPv6 node is coupled to an IPv4 network having a NAT, then the NAT box "must also contain a fully functional IPv6 router including the 6to4 mechanism" in order for the 6to4 proposal to still be operable in the IPv4 network having the NAT. However, the modification of existing NATs to include IPv6 routers to include the 6to4 mechanism may not be a practical solution.

Further, the IPv4 addresses of the 6to4 protocol are assumed to be global public addresses. Hence, if an IPv6 node (i.e., a correspondent node) wants to communicate with a roaming mobile IPv6 node, the 6to4 address of the roaming mobile IPv6 node must be a global public address, not a private address.

One proposal for traversing a NAT by an IPv6 node using automatic tunneling is described in an IETF Draft by Huitema, entitled "Teredo: Tunneling IPv6 over UDP through NATs", Sep. 17, 2002, available on the World Wide Web at the address: "http://www.ietf.org/internet-drafts/draft-ietf-ngtrans-shipworm-08.txt."

Huitema suggests that IPv6 nodes located behind NATs can access "Teredo servers" and "Teredo relays" to learn their "global address" and to obtain connectivity, where clients, servers, and relays can be organized in "Teredo networks". Huitema relies on a complex client server-based interaction between the client (i.e., the IPv6 node) behind the NAT in the private IPv4 address realm, and the Teredo server and Teredo relay on the opposite side of the NAT in the public IPv4 address realm. Hence, the communications between the IPv6 node on the private side of the NAT, and the Teredo server and the Teredo relay on the public side of the NAT, (via the NAT), require that the IPv6 node has a specified path to both the Teredo server and the Teredo relay gateway on the public side; hence, the IPv6 node needs to use the same IPv4 identifier (e.g., UDP port IP address that is being translated by the NAT).

This same IPv4 identifier for communications with the Teredo server and Teredo relay, however, is impossible with symmetric NATs because the Teredo server and Teredo relay each have a distinct corresponding IPv4 public address. In particular, symmetric NATs index their address translation tables not only by private IP address/private UDP port/public IP address/public UDP port of the packet output by a private IPv4 node, but also by the destination IP address and destination port specified by the packet and destined for the public IPv4 network. Hence, since the Teredo server and Teredo relay have distinct IP addresses, the symmetric NAT will not map the packets to the same private IP address/private UDP port used by the private IPv4 node. Hence, the Huitema solution cannot traverse a symmetric NAT.

SUMMARY OF THE INVENTION

There is a need for an arrangement that enables IPv6 nodes to communicate transparently across an IPv4 network, regardless of whether the IPv6 nodes are separated across the IPv4 network by a symmetrical NAT.

There also is a need for an arrangement that enables IPv6 nodes to transport IPv6 packets across an IPv4 network, without the necessity of each IPv6 node serving as an IPv4 endpoint to store state information.

There also is a need for an arrangement that enables IPv4 connections to be established across a NAT by IPv6 gateways in a manner that minimizes use of NAT resources.

These and other needs are attained by the present invention, where a source IPv6 mobile node is configured for establishing an IPv4 connection with destination IPv6 router using a synthetic tag address, specifying a forwarding protocol, that serves as a valid care-of address for the IPv6 mobile node. The synthetic tag address has an address prefix routed to the IPv6 router, where an IPv6 packet specifying the address prefix within its corresponding destination address field is routed to the destination IPv6 router. The address prefix includes a protocol identifier, and an IPv4 address for the IPv6 router. An address suffix for the synthetic tag address specifies an IPv4 source address for the source IPv6 mobile node, a UDP source port for the IPv6 mobile node, and a UDP destination port for the destination IPv6 router. Hence, the synthetic tag address enables the destination IPv6 router to send an IPv6 reply packet back to the source IPv6 mobile node via the IPv4 network, regardless of whether the IPv4 network includes a NAT that separates the source and destination IPv6 mobile routers.

One aspect of the present invention provides method in an IPv6 mobile node. The method includes first generating an IPv6 tag address that includes a prescribed protocol identifier for an IPv6 gateway configured for transferring packets between an IPv4 network and an IPv6 network, and an IPv4 gateway address for the IPv6 gateway. The method also includes second generating an IPv6 packet having a source address field that specifies the IPv6 tag address, and a header that specifies a home address assigned to the IPv6 mobile node. The method also includes encapsulating the IPv6 packet in an IPv4 packet. The IPv4 packet has an IPv4 header including a destination address field that specifies the IPv4 gateway address, and a source address field specifying a mobile node IPv4 address for the IPv6 mobile node. The IPv4 packet also includes a transport header having a source port field specifying a prescribed UDP port for the IPv6 mobile node, and a destination port field specifying a prescribed UDP port for the IPv6 gateway used for identifying transfer of the IPv6 packet between the IPv4 network and the IPv6 network. The method also includes outputting the IPv4 packet to the IPv6 gateway via the IPv4 network, for transfer of the IPv6 packet onto the IPv6 network.

Another aspect of the present invention provides a method in an IPv6 router. The method includes attaching to an IPv4 network using an IPv4 gateway address and an IPv6 network using an IPv6 address, and receiving from the IPv4 network an IPv4 packet having a destination address field specifying the IPv4 gateway address, a destination port field specifying a prescribed UDP gateway port, a source address field specifying an IPv4 address and a source port field specifying a second UDP port. The method also includes recovering an IPv6 packet from the IPv4 packet in response to detecting the prescribed UDP gateway port in the destination port field. The method also includes detecting within a source address field of the IPv6 packet an IPv6 tag address starting with a prescribed protocol identifier for an IPv6 gateway to transfer the IPv6 packet between the IPv4 network and the IPv6 network. The IPv6 tag address further includes a second IPv4 address distinct from the IPv4 address. The method also includes modifying the IPv6 tag address into a modified IPv6 tag address, in response to detecting the prescribed protocol identifer, by overwriting the second IPv4 address with the IPv4 address and inserting the second UDP port into the IPv6 tag address. The IPv6 packet is updated into an updated IPv6 packet by inserting the modified IPv6 tag address into the source address field of the IPv6 packet, and the updated IPv6 packet is output onto the IPv6 network.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 3A, 3B and 3C are diagrams illustrating IPv6 tag addresses generated and modified by the IPv6 source and destination mobile routers serving as the IPv4 connection endpoints.

Figure 5A:
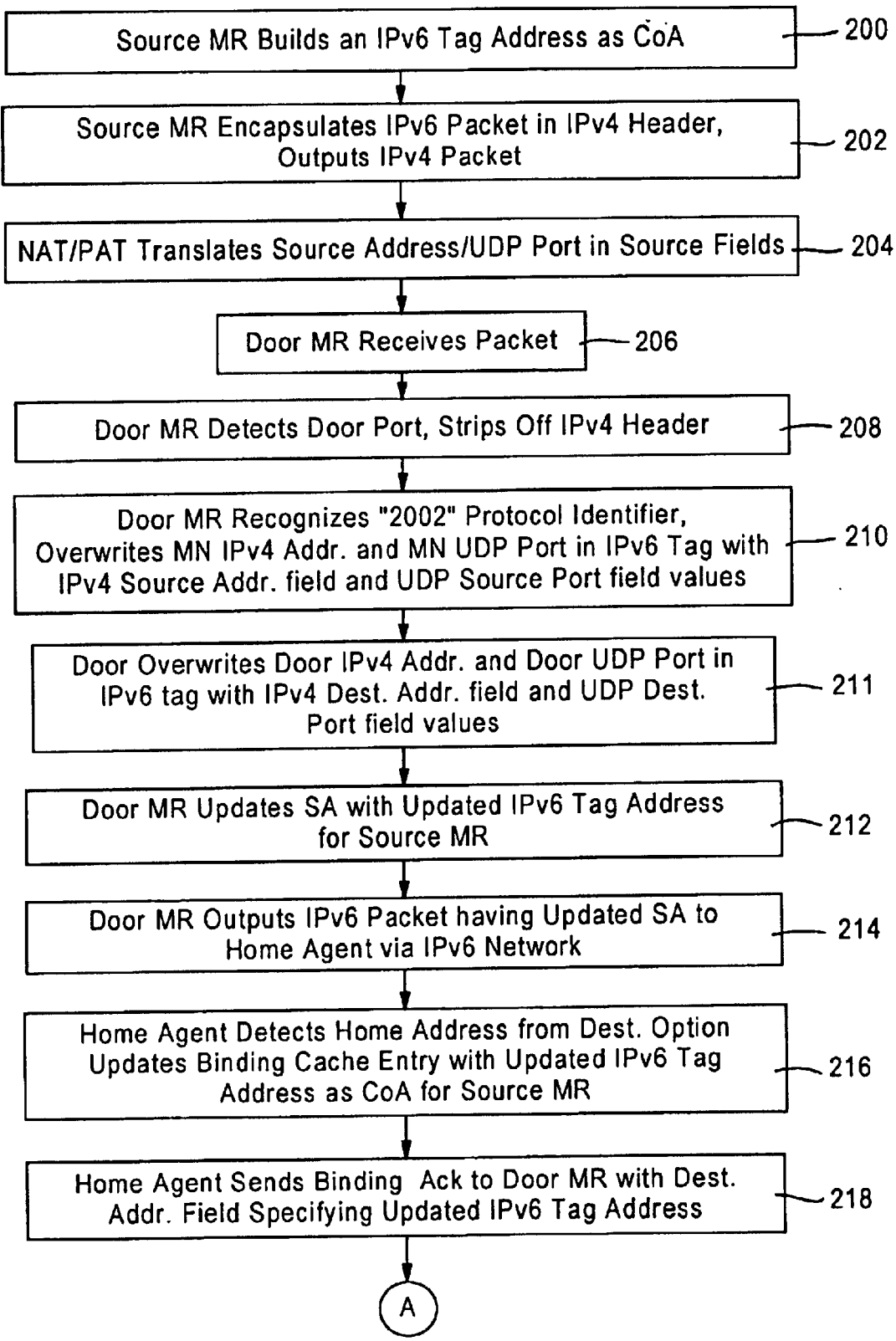
Figure 5B:
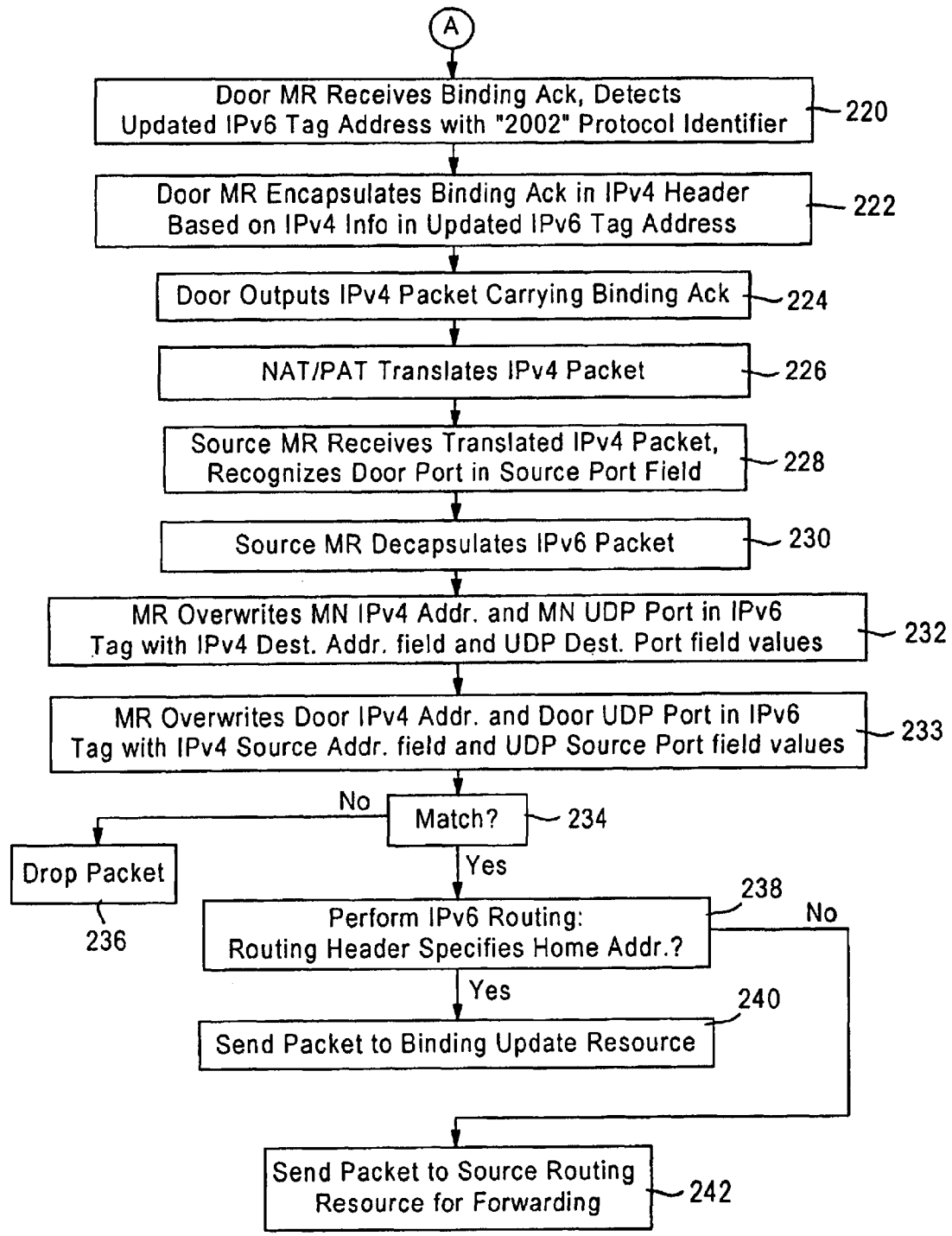

FIGS. 5A and 5B are flow diagrams summarizing the method of sending IPv6 packets across an IPv4 network, according to an embodiment of the present invention.

Figure 6:
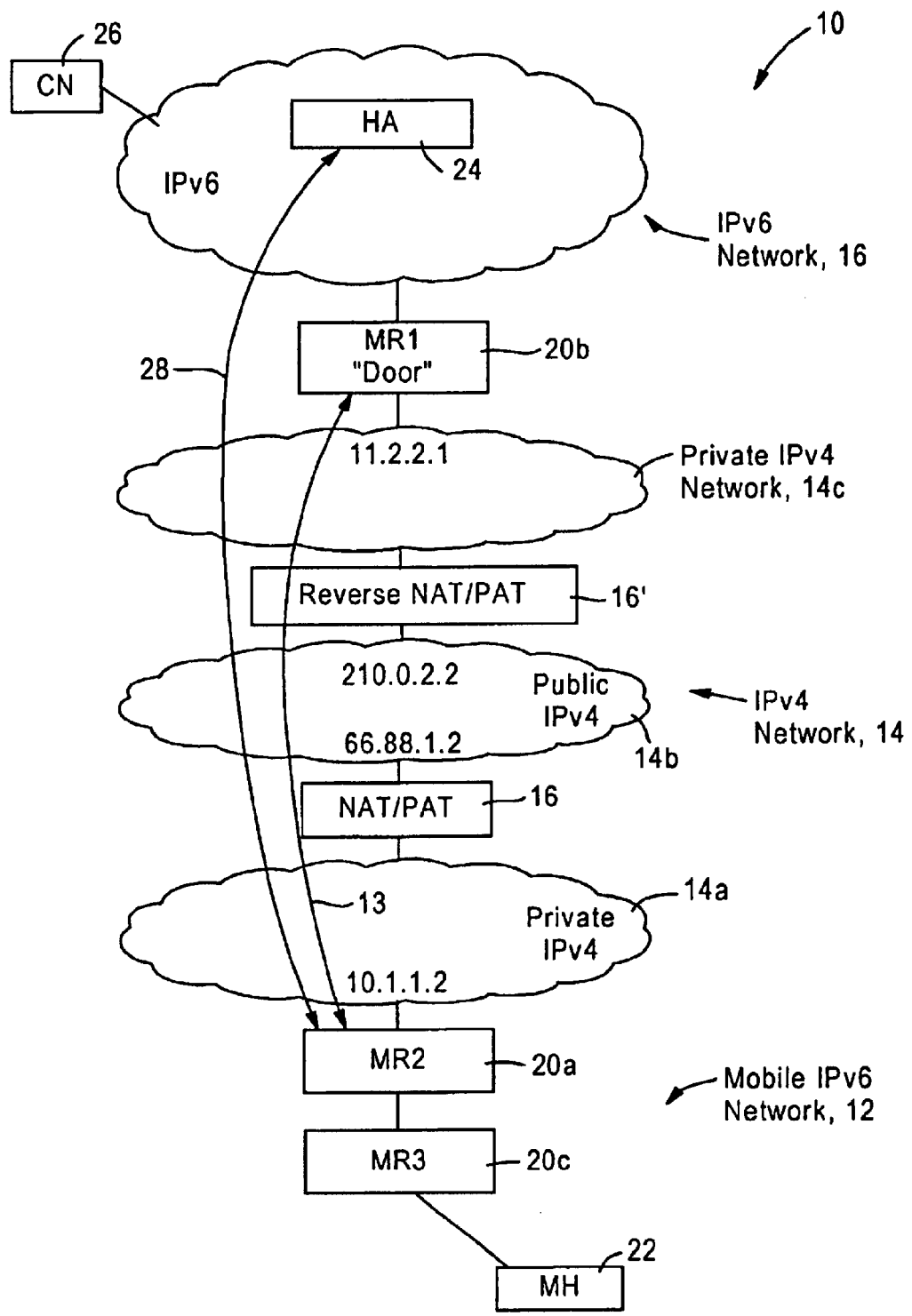

FIG. 6 is a diagram illustrating IPv6 mobile routers establishing an IPv4 connection across an IPv4 network utilizing a network address translator (NAT) and a reverse NAT, according to an alternate embodiment of the present invention.

BEST MODE FOR CARRYING OUT THE INVENTION

The disclosed embodiment is an improvement of the arrangement disclosed in the above-incorporated parent application Ser. No. 10/383,567, filed Mar. 10, 2003 (hereinafter "parent application") directed to tunneling IPv6 packets across an IPv4 network based on use of IPv6 based reverse routing headers. The generation and use of reverse routing headers was published on Jun. 19, 2002 by the inventors as an Internet Draft, "IPv6 Reverse Routing Header and its application to Mobile Networks" available on the World Wide Web "http://www.ietf.org/internet-drafts/draft-thubert-nemo-reverse-routing-header-00.txt" and is incorporated in its entirety herein by reference. A more recent version was published Oct. 11, 2002, available on the World Wide Web at "http://www.ietf.org/internet-drafts/draft-thubert-nemo-reverse-routing-header-01.txt" and incorporated in its entirety herein by reference.

The disclosed improvement eliminates the necessity of reverse routing headers by generating an IPv6 tag address that is a valid IPv6 address and that serves as the care-of address for an IPv6 mobile node (e.g., IPv6 mobile host computer, IPv6 mobile router). In particular, inventors of the subject application published an Internet Draft in February 2003, entitled "IPv4 Traversal for IPv6 Based Mobile Routers" available on the World Wide Web at "http://www.ietf.org/internet-drafts/draft-thubert-nemo-ipv4-traversal-00.txt" and incorporated in its entirety herein by reference. A more recent version of that Internet Draft (draft-thubert-nemo-IPv4-traversal-01) is attached as an Appendix.

As described in the attached Appendix, the IPv6 tag address (referred to in the Appendix as a "Doors Handle") includes a 48-bit address prefix that includes a 32-bit IPv4 address of a destination IPv6 gateway router (referred to in the Appendix as a "Door"), and a 16-bit prescribed protocol identifier (referred to in the Appendix as the 3-bit Format Prefix and the 13-bit Top-Level Aggregation Identifier (TLA ID)) that enables the destination IPv6 gateway router (i.e., "Door") to identify that the received IPv4 packet includes an IPv6 packet that needs to be forwarded on a connected IPv6 network. In addition, the 16-bit prescribed protocol identifier is positioned at the beginning of the 48-bit address prefix, in accordance with RFC 3056, to enable the 48-bit address prefix to be routable to the destination IPv6 gateway router. Hence, the 128-bit care-of address of the IPv6 mobile node is routable to the destination IPv6 gateway router by other nodes in the connected IPv6 network according to existing routing protocols, and includes sufficient information to enable the IPv6 gateway router to forward any IPv6 packet specifying the care-of address in the destination address field to the IPv6 mobile node via the IPv4 network.

Figure 1:
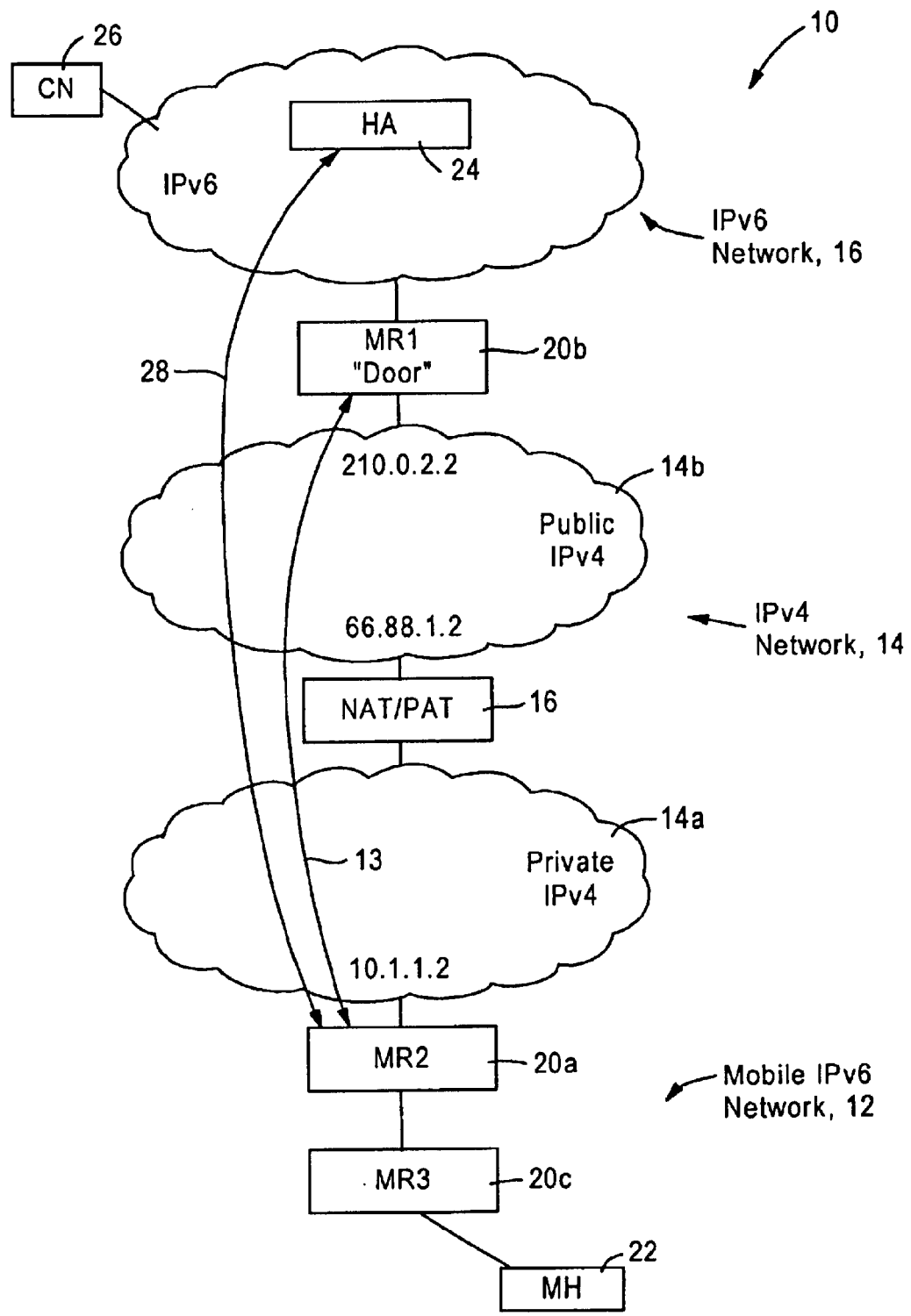
FIG. 1 is a diagram illustrating IPv6 mobile routers establishing an IPv4 connection across an IPv4 network utilizing a network address translator (NAT), according to an embodiment of the present invention.

FIG. 1 is a diagram (reproduced from the parent application) illustrating a network 10, where a mobile IPv6 network 12 is configured for establishing an IPv4 tunnel 13 across an IPv4 network 14 to a destination IPv6 network 16. In particular, the mobile network 12 includes at least a mobile router (MR) 20a configured for sending and receiving packets according to IPv6 protocol. The mobile router 20a also is configured for communications with a corresponding home agent (HA) 24 configured for forwarding packets, addressed to the mobile router home address, to the mobile router 20a's care of address (CoA), according to Mobile IP Protocol as described in an IETF Draft by Johnson et al., entitled "Mobility Support in IPv6", Jan. 20, 2003, available on the World Wide Web at "http://www.ietf.org/internet-drafts/draft-ietf-mobileip-ipv6-21.txt" (the disclosure of which is incorporated in its entirety herein by reference).

The mobile router 20a ("MR2") may roam as a single roaming mobile router, or may be the top-level mobile router (TLMR) of a mobile network 12 having attached IPv6 nodes. As illustrated in FIG. 1, the mobile router 20a serves as a TLMR in the mobile network 12 for a mobile router 20c ("MR3") and a mobile host (MH) 22.

The mobile router 20a is configured for establishing a bidirectional tunnel 28 with its corresponding home agent (HA) 24, enabling packets sent to the home address of the mobile router 20a (e.g., by a correspondent node (CN) 26) to be forwarded by the home agent 24 to the care of address for the mobile router 20a.

Since the source mobile router 20a is attached to an IPv4 network 14, as opposed to an IPv6 router, the source mobile router 20a also is configured for establishing an IPv4 tunnel 13 (e.g., a UDP tunnel) with a corresponding IPv6 destination mobile router ("MR1") 20b, also referred to as a "door" mobile router or an IPv6 gateway, having a connection on the IPv4 network 14. Hence, the mobile router 20a is configured for implementing the bidirectional tunnel 28 with its corresponding home agent 24 via the IPv4 tunnel 13, using the door mobile router 20b as an endpoint in the IPv4 tunnel 13.

The IPv4 network 14 may optionally include a Network Address Translator (NAT) and/or a Port Address Translator (PAT) 16. As illustrated in FIG. 1, the mobile router 20a is attached to a private IPv4 network 14a: the mobile router 20a may obtain its IPv4 address (e.g., "10.1.1.2") based on a prior configuration (static or unnumbered), Dynamic Host Configuration Protocol (DHCP), or IP Control Protocol (IPCP) for Point-to-Point protocol (PPP) links. The private IPv4 network 14a has access to the network address translator (NAT) 16 having a Port Address Translator (PAT) to enable nodes in the private network 14a to be addressable in the public IPv4 network 14b.

The mobile router 20a also is configured to access the door mobile router 20b at a predetermined IPv4 address (e.g., "210.0.2.2"), and a prescribed door port (e.g., UDP port "434") enabling the mobile router 20a to establish the IPv4 tunnel 13 with the door mobile router 20b without the necessity of any discovery protocols. Note that the mobile router 20a may be configured to store a plurality of door IPv4 addresses for multiple door mobile routers, in which case the mobile router 20a could be configured to locate an optimum door mobile router.

As described above, a problem with establishing an IPv4 tunnel traversing the NAT/PAT 16 is that symmetric NATs 16 index their address translation tables not only by private IP address/private UDP port/public IP address/public UDP port of the packet being translated for a private IPv4 node (in this case the mobile router 20a), but also by the destination IP address and destination port for an ingress packet from the public IPv4 network to the door mobile router 20b.

According to the disclosed embodiment, the mobile router 20a is configured for initiating the bidirectional IPv4 tunnel 13 using the same source/destination IPv4 address pair, ensuring that the IPv4 tunnel endpoints 20a and 20b remain the same. Since the endpoints remain the same, the bidirectional IPv4 tunnel 13 can be reliably maintained across the NAT 16 for multiple IPv6 data streams.

Further, the mobile router 20a utilizes a care-of address that includes all necessary routing information to enable any IPv6 packet specifying the care-off address as its destination to reach the IPv6 gateway 20b according to existing routing protocols, and for enabling the IPv6 gateway 20b to forward the IPv6 packet to the mobile router 20a via the IPv4 tunnel 13. As described below with respect to FIG. 3A, the mobile router 20a is configured for generating in IPv6 tag address 30 that includes a prescribed protocol identifier 32: the protocol identifier 32 is used by the IPv6 gateway 20b to identify that the IPv6 packet 30, received via the IPv4 network 14, is to be transferred to the IPv6 network 16.

FIG. 6 is a diagram illustrating a variation of FIG. 1, where the IPv6 gateway 20b is in a private domain of a private IPv4 network 14c instead of the public IPv4 network 14b of FIG. 1. In this case, the NAT 16' at the would own the public address ("210.0.2.2") that is seen as the door address by the MN. The NAT 16' is preconfigured to 'reverse NAT' all traffic for the UDP port/public address to the private address ("11.2.2.1") of the door 20b. Hence in this case both source IPv4 address 102 and destination IP address 103 (and source UDP port 104 and destination UDP port 105) should be overwritten by the door 20b into the IPv6 tag address 30, as illustrated in FIG. 3C, to ensure the door 20b can properly route any IPv6 packet using the modified IPv6 tag address 30".

Figure 2:
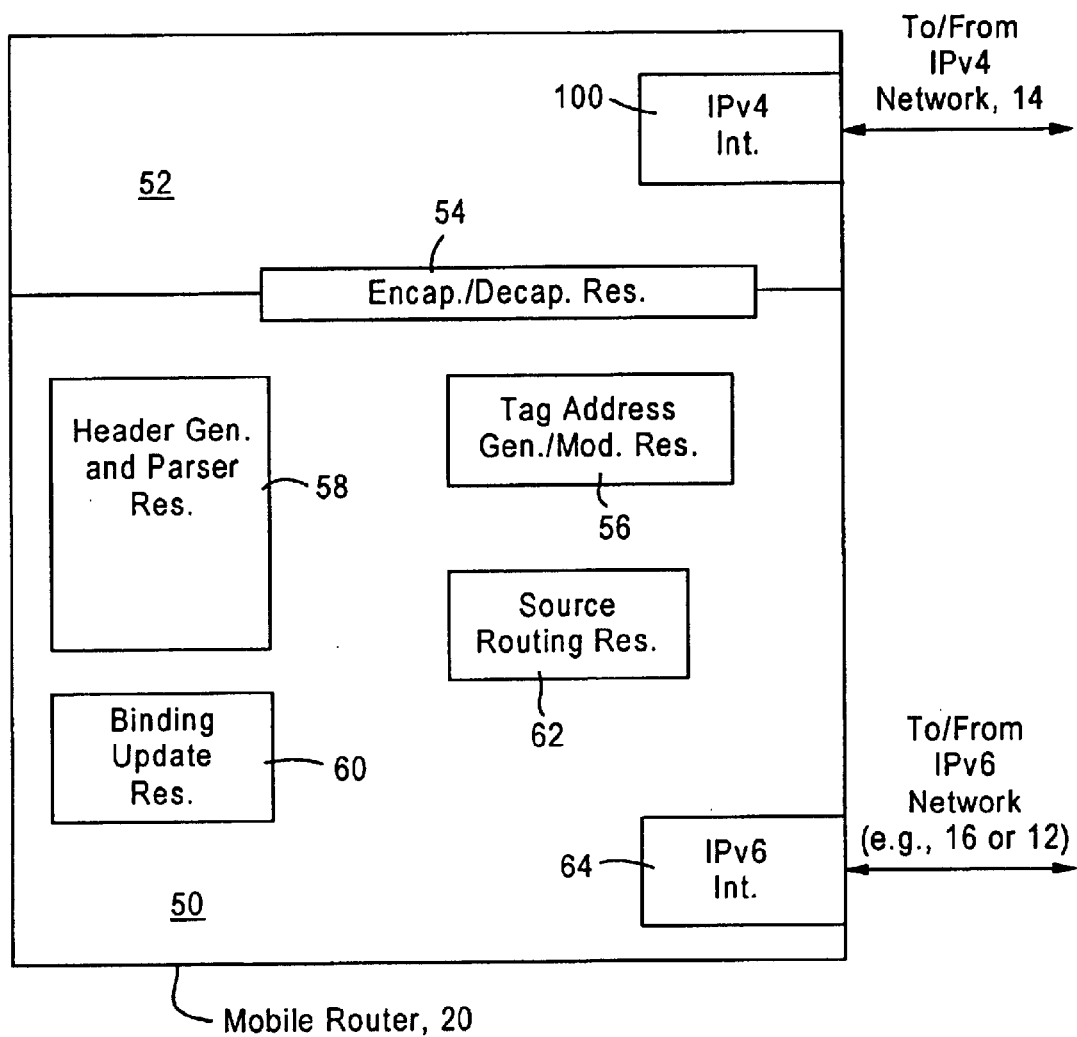
FIG. 2 is a diagram illustrating in further detail the IPv6 mobile routers of FIG. 1, according to an embodiment of the present invention.

FIG. 2 is a block diagram illustrating a mobile router 20 (e.g., 20a, 20b, or 20c) configured for sending packets according to mobile IPv6 protocol, as well as serving as an endpoint for an IPv4 tunnel 13. The mobile router 20 includes an IPv6 portion 50, an IPv4 portion 52, and an encapsulation/decapsulation resource 54.

The IPv6 portion 50 includes a tag address generation/ modification resource 56, an IPv6 header generation and parser resource 58, a binding update resource 60, a source routing resource 62, and an IPv6 interface 64. The tag address generation/modification resource 56 is configured for generating the IPv6 tag address 30, illustrated in FIG. 3A, when the mobile router 20 is acting as a mobile router 20a initiating a connection to an IPv6 gateway mobile router 20b via an IPv4 network 14.

As illustrated in FIG. 3A, the tag address generation/ modification resource 56 is configured for generating an IPv6 tag address 30 that includes a prescribed protocol identifier 32 ("2002" hexadecimal), a source IPv4 address 34 of the mobile router 20a ("0a01:0102" IPv6 hex notation, "10.1.1.2" IPv4 decimal notation) a public IPv4 gateway address 36 for the IPv6 gateway 20b ("d200:0202" IPv6 hex notation, "210.0.2.2" IPv4 decimal notation), a 16-bit Site Level Aggregation Identifier (SLA) ("0801" hex) 42 set by an administrator of the IPv4 gateway 20b (e.g., to represent a 64-bit IPv6 address for the IPv6 gateway 20b), a source UDP port 38 ("0001"), and a prescribed public UDP port 40 ("01b2" hex, "434" decimal) for the IPv6 gateway 20b. The source IPv4 address 34 and the source UDP address 38 may be private addresses and ports, based on connecting to the private IPv4 network 14a. As described above, the public IPv4 gateway address 36 and the prescribed public UDP gateway port 40 are known by the mobile router 20a upon attachment to the network 14. If no transport layer header is used in the IPv4 tunnel 13 (e.g., in the case where the NAT 16 does not include a PAT), then the values 38 and 40 can be set to zero.

The 16-bit protocol identifier 32, having a hexadecimal value of "2002" (0010 0000 0000 0010 binary) is used by the door mobile router 20b to identify the 6to4 protocol, namely forwarding the IPv6 packet "up" to the home agent 24 via the IPv6 network 16. In accordance with RFC 3056 and as described in the attached Appendix, the IPv6 gateway 20b recognizes the protocol identifier 32 as identifying the care-of address as a 6to4 address that specifies IPv4 address information for routing a packet across an IPv4 tunnel 13. Note that other protocol identifier values may be used as prescribed during implementation.

Hence, the IPv6 tag address 30 generated by the tag address generation/modification resource 56 serves as the care of address for the mobile router 20a while the mobile router 20a is attached to the IPv4 network 14 instead of an IPv6 attachment router.

As shown in FIG. 2, the mobile router 20 also includes a header generation and parser resource 58 configured for generating an IPv6 header according to mobile IPv6 protocol. The mobile router 20 also includes a binding update resource 60 configured for sending a binding update message to its corresponding home agent 24 in response to attaching to a network, in this case a private IPv4 network 14a. The mobile router 20 also includes a source routing resource 62 configured for routing received IPv6 packets having routing headers according to Mobile IPv6 Protocol and reverse routing headers as specified by the Internet Draft by Thubert et al.

Figure 4:
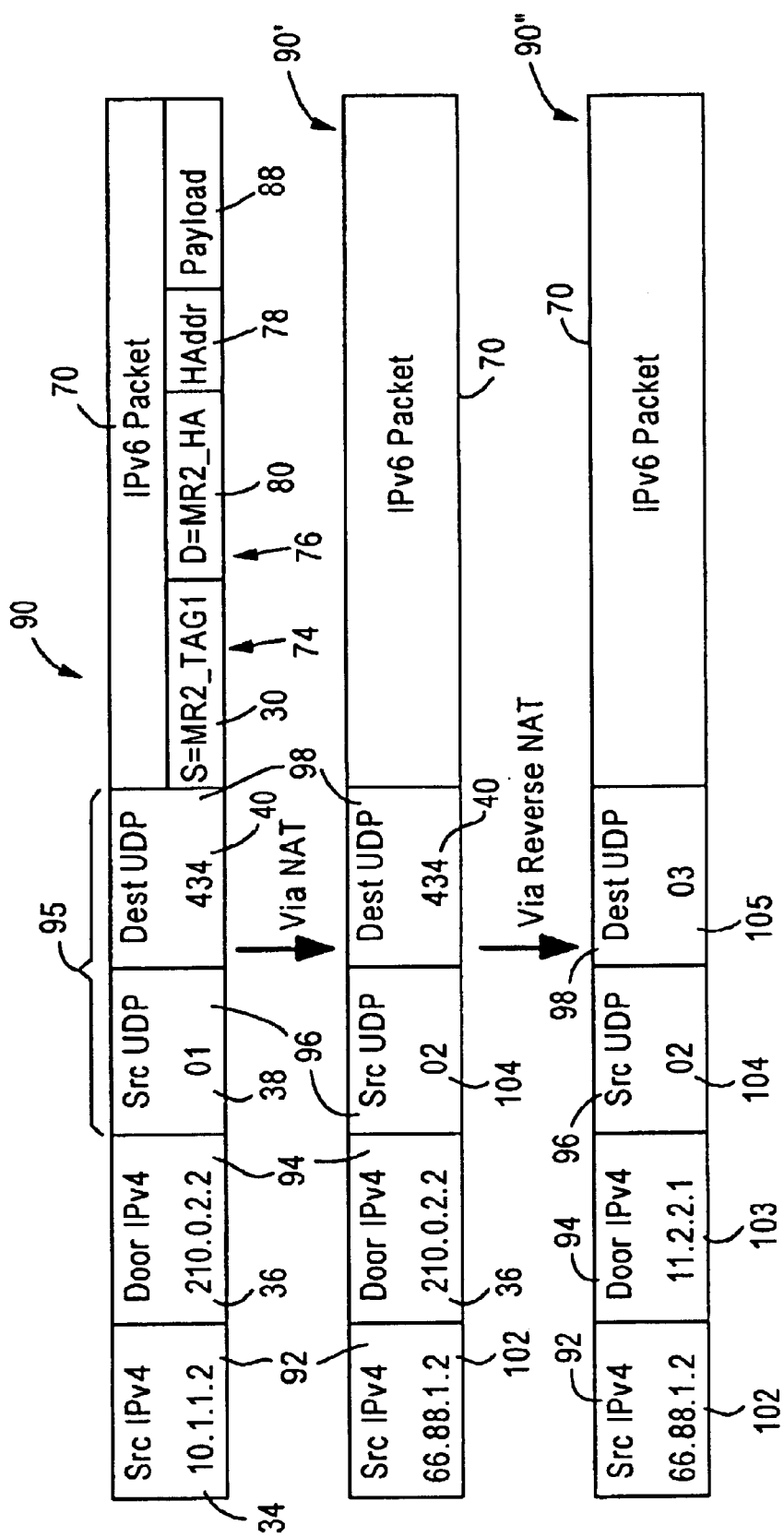
FIG. 4 is a diagram illustrating an IPv4 packet, output by the source mobile node of FIG. 1 and carrying an IPv6 packet, that encounters address translation by a NAT/PAT and a reverse NAT/PAT.

FIG. 4 is a diagram illustrating an IPv4 packet 90 encapsulating IPv6 packet 70, for example a binding update message. The binding update message 70 is generated by the header generation and parser resource 58 and the binding update resource 60, for delivery to the home agent 24. The IPv6 packet 70 includes a source address field 74 specifying the care-of address 30, a destination address field 76, and in this example a destination option 78 specifying the home address (Haddr) of the mobile router 20a. The IPv6 packet 70 also includes the payload 88, in this example a binding update message. The source address field 74 specifies the tag address ("MR2_TAG1") 30 for the mobile router 20a, and the destination address field 76 specifies the IPv6 home agent address ("MR2_HA") 80 for the home agent 24.

Once the tag address generation/modification resource 56 in the mobile router 20a generates the IPv6 tag address 30 and the header generator 58 generates the IPv6 header 72 for the corresponding payload 88, the encapsulation/ decapsulation resource 54 encapsulates the IPv6 packet 70 into an IPv4 packet 90, illustrated in FIG. 4. The IPv4 packet 90 includes an IP header having a source address field 92 specifying the private IPv4 "Care-of Address" (e.g., "10.1.1.2") 34 of the mobile router 20a, and a destination address field 94 specifying the public IPv4 gateway address (e.g., "210.0.2.2") 36 of the door mobile router 20b. The IPv4 packet 90 also includes a transport header 95 that includes a source UDP port field 96 specifying a source UDP address ("01") 38, and a destination UDP port field 98 specifying the prescribed door port 40, in this case the known mobile IP port "434". The encapsulation/ decapsulation resource 54 of FIG. 2 supplies the IPv4 packet 90 to an IPv4 interface 100 configured for outputting the IPv4 packet 90 onto the IPv4 network 14 according to IPv4 protocol.

As illustrated in FIG. 4, the traversal of the IPv4 packet 90 via the NAT 16 from the private network 14a to the public network 14b causes the NAT/PAT 16 to modify the IPv4 packet 90 into a translated packet 90'. In particular, the NAT/PAT 16 translates the values 34 and 38 in the source address field 92 and the source port field 96 with a public IPv4 address value (e.g., "66.88.1.2") 102 and a public port ("02") 104, respectively. Hence, the door mobile router 20b receives the translated packet 90' via the public IPv4 network 14b.

As illustrated in FIG. 6, if the door mobile router 20b is behind a second NAT/PAT 16', also referred to as the reverse NAT/PAT 16', then the NAT/PAT 16' translates the values 36 and 40 in the destination address field 94 and the destination port field 98 with a private IPv4 address value (e.g., "11.2.2.1") 103 and a private port ("03") 105, respectively. Hence, the door mobile router 20b of FIG. 6 receives the translated packet 90" via the private IPv4 network 14c.

The door mobile router 20b is configured to recognize itself as being a door mobile router configured for sending IPv6 packets between the IPv6 network 16 and the IPv4 network 14. Hence, the IPv4 interface 100 of the door mobile router 20b of FIG. 2 is configured for forwarding the translated packet 90' to the encapsulation/decapsulation resource 54 in response to detecting the prescribed public gateway UDP port 40 having the value "434" in the destination port field 98.

In the case of FIG. 6 where the door mobile router resides in the private IPv4 network 14c, the IPv4 interface 100 may be configured for forwarding the translated packet 90" to the encapsulation/decapsulation resource 54 in response to detecting the prescribed private gateway UDP port 105 having the value "03" in the destination port field 98. The resource 54 decapsulates the IPv6 packet 70 by stripping off the IPv4 header, and forwarding the IPv6 packet 70 to the IPv6 module 50.

The header generation and parser resource 58 parses the IPv6 header. In response to detecting the protocol identifier 32 in the IPv6 tag address 30 in the source address field 74, the header generation and parser resource 58 issues a function call to the tag address generation/modification resource 56. In the case of FIG. 1, the tag address generation/modification resource 56 can merely modify the IPv6 tag address 30 by overwriting the private source IP address 34 and the private source UDP port 38 specified in the IPv6 tag address 30 with the respective translated public values 102 and 104, resulting in a modified IPv6 tag address 30' of FIG. 3B that specifies the public IPv4 address ("4258:0102" IPv6 hex notation, "66.88.1.2" IPv4 decimal notation) 102 of the mobile router 20a, the public UDP port ("02") 104 of the mobile router 20a, and the public IP address 36 and UDP port 40 for the door mobile router 20b.

Since the door mobile router may be in a private network 14c, preferably the tag address generation/modification resource 56 also should overwrite the door IP address 36 and the door UDP port 40 specified in the received IPv6 tag address with the respective translated private values 103 an5 104, resulting in a modified IPv6 tag address 30" of FIG. 3C that specifies the private IPv4 address ("0b02:0201" IPv6 hex notation, "11.2.2.1" IPv4 decimal notation) 103 of the door mobile router 20b, the private UDP port ("03") 105 of the mobile router 20a, and the public IP address 102 and UDP port 104 for the mobile router 20a.

Hence, the modified IPv6 tag address 30' (for FIG. 1) or 30" (for FIG. 6) includes all parameters necessary for the door mobile router 20b to encapsulate an IPv6 packet to be forwarded to the mobile router 20a via the IPv4 network 14.

The IPv6 interface 64 of the door mobile router 20b outputs the modified IPv6 packet (having the modified IPv6 source address 30' or 30") to the home agent 24 via the IPv6 network 16.

The home agent 24 receives the modified IPv6 packet in response to detecting the home agent address value (MR2__HA) 80 in the destination address field 76. The home agent 24 reads Mobile IPv6 home address destination option 78 (i.e., as an index into the binding cache). The home agent 24 can then identify the binding update request 88, and store the modified tag address 30' or 30" as the "care of address" for the mobile router 20a in its corresponding binding cache entry. Hence, the traversal of the IPv4 network 14 can be transparent to the home agent 24.

The home agent 24 now can send a packet directly back via the tunnel 28 by specifying the modified care-of address 30' or 30" in the destination address field. The home agent 24 inserts its home agent IPv6 address (e.g., "MR2__HA") 80 in the source address field, the modified care of address 30' or 30" in the destination address field, and a type 2 routing header that specifies the home address for the mobile router 20a. The home agent 24 then outputs onto the IPv6 network 16 the packet that includes the binding acknowledgment payload 116.

The IPv6 gateway 20b will have advertised on the IPv6 network, using existing routing protocols, that IPv6 addresses having the address prefix "2002:d200:0202/48" (for FIG. 1) or "2002:0b02:0201/48" (for FIG. 6) should be routed to the IPv6 gateway 20b. Hence, the modified care-of address 30' and 30" (as well as the original care of address 30) are routable to the IPv6 gateway 20b. Consequently, the packet from the home agent 24 is routed to the IPv6 gateway 20b using existing routing protocols. Note that if the address prefix is based on a private address as in the case of FIG. 6, then prefix distribution needs to be limited accordingly.

The door mobile router 20b, in response to receiving the IPv6 packet from the home agent 24, uses its header generation and parser resource 58 to parse the routing header 114. In response to detecting the protocol identifier 32 in the modified IPv6 tag address 30' or 30", the door mobile router 20b utilizes its encapsulation/decapsulation resource 54 to generate an IPv4 header that specifies the public address 102 and public port 104 of the mobile router 20a in the respective destination headers. The IPv4 interface 100 outputs the packet onto the bidirectional tunnel 13.

The IPv4 packet, having been translated by the NAT/PAT 16, specifies the private IP address 34 and the private UDP port 38 in the destination address and destination port fields, respectively. The mobile router 20a can then recover the IPv6 packet 112 based on identifying the source UDP port specifying the public door UDP value 40. As described below, the mobile router 20a also overwrites the mobile node IPv4 address value 102 and the public UDP port value 104 in the received care-of address 30' with the private IP address 34 and the private UDP port 38. The mobile router 20a also should overwrite the door IPv4 address value 103 and the UDP port value 105 in the received care-of address 30' with the public IP address 36 and the public door port 40 in case the door 20b is accessed via the reverse NAT (as in FIG. 6).

If the overwriting operation does not result in recovery of the mobile router 20a's care of address 30, the packet is dropped; if the mobile router 20a's care of address 30 is recovered from the overwriting operation, the mobile router 20a processes the received IPv6 packet accordingly. For example, if a type 2 routing header is present, the mobile router 20*a* processes the packet accordingly: if the type 2 routing header specifies the home address for the mobile router 20*a*, the mobile router 20*a* forwards the payload to its upper layer protocol; if another IPv6 address is specified in the type 2 routing header (e.g., for mobile router 20*c* or mobile host 22), the mobile router 20*a* forwards the payload to the source routing resource 62 for further routing.

Since the Care Of address can be translated by the mobile router 20*a* and the IPv6 gateway 20*b*, problems may arise with Authentication Header (AH) and upper layer checksum computations if the Care Of address was included in the signed information. As a result, the reference packet for AH is always a packet where the IPv6 source and destination addresses are the Home Address of the mobile node and the address of the home agent, and the slots and segment left of a Routing Header are set to 0.

FIGS. 5A and 5B are diagrams illustrating the method of sending IPv6 packets via an IPv4 tunnel according to an embodiment of the present invention. The steps described herein with respect to FIGS. 5A and 5B can be implemented in the respective mobile routers as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 200, where the tag address generation resource 56 of the source mobile router 20*a* builds the IPv6 tag address 30 of FIG. 3A as its care of address. The encapsulation/decapsulation resource 54 of the source mobile router 20*a* encapsulates in step 202 the IPv6 packet 70 in an IPv4 header, and outputs the IPv4 packet 90 onto the private IPv4 network 14*a*. The NAT/PAT 16 translates in step 204 the private source address 34 and private UDP port 38 from the source address field 92 and the source port field 96 into the public IP address 102 and the public port 104, respectively, and outputs the translated IPv4 packet 90'.

The door mobile router 20*b* receives in step 206 the translated IPv4 packet 90'. The IPv4 interface 100 of the door mobile router 20*b* detects in step 208 the door port value ("434") 40 specifying mobile IP, and in response the encapsulation/decapsulation resource 54 strips the IPv4 header. The header generation and parser resource 58 of the door mobile router 20*b* detects in step 210 the protocol identifier 32 in the IPv6 tag address 30, and in response the tag modification resource 56 modifies the IPv6 tag address 30 by overwriting the private IPv4 address 34 and UDP port 38 of the source MR 20*a* with the public IPv4 address 102 and UDP port 104, respectively; the door IPv4 address 36 and the door UDP port 40 also may be overwritten in step 211 with the values in the destination port field 94 and the UDP port field 98 in case the door 20*b* is within the private address space of the private IPv4 network 14*c* (as illustrated in FIG. 6).

The header generation and parser resource 58 of the door mobile router 20*b* updates in step 212 the source address field with the updated IPv6 tag address 30' or 30". The IPv6 interface 64 of the door mobile router 20*b* outputs in step 214 the modified IPv6 packet 70' to the home agent 24 via the IPv6 network 16.

The home agent 24 detects in step 216 the home address 86 of the source mobile router 20*a* from the destination options field 78, and responds to the binding update 88 by updating the binding cache entry for the source mobile router 20*a* to specify the updated IPv6 tag address (MR2_ TAG2) 30' or 30" as the care of address for the source mobile router 20*a*. The home agent outputs in step 218 the binding acknowledgment 112 that includes the destination address field specifying the updated IPv6 tag address 30' or 30" and a type 2 routing header specifying the home address for the source mobile router 20*a*.

Referring to FIG. 7B, the door mobile router 20*b* receives in step 220 the binding acknowledgment message. The parser resource 58 of the door mobile router 20*b* detects the updated IPv6 tag address 30' in the destination address field that specifies the protocol identifier 32.

The door mobile router 20*b* responds to the protocol identifier 32 in accordance with RFC 3056, and in response checks whether it has an IPv6 connected route to its 64-bit address prefix 250 ("2002:d200:0202:0801/64"): if an IPv6 route is detected in its routing tables, the door mobile router 20*b* encapsulates the binding acknowledgment message in an IPv4 header based on the public address 102 and the public port 104 specified in the care of address 30' for the source mobile router 20*a*. The door mobile router 20*b* outputs in step 224 the IPv4 packet carrying the binding acknowledgment.

After the NAT/PAT 16 translates the destination public address 102 and the destination public port 104 of the mobile router 20*a* to the respective private address 34 and private port 38 in step 226, the source mobile router 20*a* receives the translated IPv4 packet in step 228. The IPv4 interface 100 of the source mobile router 20*a* recognizes the prescribed door port 40 in the source port field, and in response the encapsulation/decapsulation resource 54 of the source mobile router 20*a* decapsulates the IPv6 packet in step 230.

The tag address generation and modification resource 56 overwrites in step 232 the public address 102 and the public port 104 in the care of address 30' or 30" specified in the destination address field of the IPv6 packet with the destination IPv4 address value and the destination UDP port specified in the IPv4 header. The tag address and modification resource 56 also should overwrite in step 233 the door IPv4 address and the door UDP port specified in the care of address 30" with the source IPv4 address value and the source UDP port value specified in the IPv4 header in the event that the door 20*b* is within the private address realm of the private IPv4 network 14*c*, where the reverse NAT 16' translates the source IPv4 address values and the source UDP port values.

If in step 234 the overwriting operation does not result in a match with the care of address 30 for the mobile router 20*a*, the packet is dropped in step 236. If in step 234 the overwriting results in a match, the mobile router 20*a* reintroduces in step 238 the IPv6 packet into the IPv6 fabric. For example, if in step 238 the type 2 routing header specifies the home address of the mobile router 20*a*, the binding acknowledgment 116 is logged in step 240 by the binding update resource 60 in the source mobile router 20*a*. Alternatively, if in step 238 the type 2 routing header specifies another address indicating that the received IPv6 packet is destined to another mobile node such as the mobile router 20*c* or the mobile host 22, the mobile router 20*a* uses the source routing resource 62 in step 242 to forward the IPv6 packet according to mobile IPv6 protocol.

According to the disclosed embodiment, IPv6 mobile routers can efficiently establish tunnels across an IPv4 network for transfer of IPv6 packets, regardless of whether the IPv4 network utilizes symmetric NATs. The IPv4 tunnel is always started by the MR sending the binding update: hence, the IPv4 tunnel is always available because the MR knows that it has its own tunnel at any point in time. If the binding update is sent often enough for the resource to maintain the path, then the path will remain active simply by default execution of Mobile IP protocol by the MR. Hence, the IPv4 tunnel is always active with no extra processing resource cost.

In addition, there is no need for the door mobile router to maintain any state, or store any information about the mobile router roaming through it, because all the necessary IPv4 routing information is in the packet. Further, the IPv4 routing information is stored in the binding cache of the home agent. Hence, when the IPv4 routing information is no longer valid, the binding cache is automatically cleared by the home agent, eliminating the possibility of any invalid state in the IPv6 network. Hence there is no need to remove obsolete information in the network due to an invalid state (e.g., in a gateway, server, etc.).

Further, the IPv4 tunnel from the MR to the door via the NAT uses the same UDP port—hence, a single resource in the NAT/PAT can be used for all the mobile routers which are attached to the TLMR 20a, eliminating the use of multiple resources in the NAT/PAT. Note that if the network does not have a PAT such that no transport header values are necessary for the tunnel 13, the UDP source and door port values 38 and 40 can be zeroed out the port fields in the tag 30.

Finally, the disclosed arrangement eliminates the necessity of a reverse routing header, enabling the tunneling over the IPv4 network to be implemented between an IPv6 mobile node (e.g., mobile host computer) and an IPv6 router that does not have Mobile IP capabilities. As such, the forwarding of packets via the IPv4 network is transparent to the IPv6 interfaces of the IPv4 endpoints. Moreover, use of the protocol identifier and the public IPv4 address of the IPv6 gateway as an address prefix enables the Care of address to be a valid IPv6 address reachable via the IPv6 gateway. Hence, the home agent can be separate from the IPv6 gateway. Note that the disclosed arrangement also can be used solely with private addresses if the IPv6 gateway and the home agent reside within the same IPv4 address realm.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an IPv6 mobile node, the method including:
    first generating an IPv6 tag address that includes a prescribed protocol identifier for an IPv6 gateway configured for transferring packets between an IPv4 network and an IPv6 network, and an IPv4 gateway address for the IPv6 gateway;
    second generating an IPv6 packet having a source address field that specifies the IPv6 tag address, and a header that specifies a home address assigned to the IPv6 mobile node;
    encapsulating the IPv6 packet in an IPv4 packet having an IPv4 header including a destination address field that specifies the IPv4 gateway address, a source address field specifying a mobile node IPv4 address for the IPv6 mobile node, and a transport header having a source port field specifying a prescribed UDP port for the IPv6 mobile node, and a destination port field specifying a prescribed UDP port for the IPv6 gateway used for identifying transfer of the IPv6 packet between the IPv4 network and the IPv6 network; and
    outputting the IPv4 packet to the IPv6 gateway via the IPv4 network, for transfer of the IPv6 packet onto the IPv6 network.

2. The method of claim 1, wherein the first generating step includes:
    specifying the prescribed protocol identifier at a beginning of the IPv6 tag address, contiguously followed by the IPv4 gateway address;
    inserting a Site-Level Aggregation Identifier (SLA) contiguously following the IPv4 gateway address, wherein the prescribed protocol identifer, the IPv4 gateway address, and the SLA form an address prefix for the IPv6 gateway; and
    inserting the mobile node IPv4 address in the IPv6 tag address.

3. The method of claim 2, wherein the first generating step further includes:
    inserting the prescribed UDP port for the IPv6 gateway contiguously following the SLA; and
    inserting the prescribed UDP port for the IPv6 mobile node contiguously following the mobile node IPv4 address, the mobile node IPv4 address and the prescribed UDP port forming an address suffix for identifying the IPv6 mobile node, the IPv6 tag address being a routable IPv6 address.

4. The method of claim 3, wherein the IPv6 mobile node has a prescribed home agent having a corresponding home agent address, the second generating step including specifying the home agent address within a destination address field of the IPv6 packet.

5. The method of claim 4, wherein the second generating step includes adding a binding update within the IPv6 packet for the prescribed home agent based on the IPv6 mobile node having attached to the IPv4 network, the IPv6 tag address being identifiable as a care-of address for the IPv6 mobile node.

6. The method of claim 5, wherein the prescribed protocol identifier is a sixteen-bit prefix having a hexadecimal value of "2002".

7. The method of claim 1, wherein the first generating includes inserting within the IPv6 tag address the prescribed UDP port for the IPv6 gateway.

8. The method of claim 7, wherein the IPv4 gateway address is a public address stored in a gateway address field of the IPv6 tag address, the prescribed UDP port for the IPv6 gateway is a public port stored in a gateway port field of the IPv6 tag address, the mobile node IPv4 address is a private address stored in a mobile node address field of the IPv6 tag address, and the prescribed UDP port for the IPv6 mobile node is a private port stored in a mobile node port field of the IPv6 tag address, the method further including:
    receiving from the IPv4 network a second IPv4 packet having a source address field specifying the IPv4 gateway address, a source port field specifying the prescribed UDP port for the IPv6 gateway, a destination address field specifying the mobile node IPv4 address, and a destination port field specifying the prescribed UDP port for the IPv6 mobile node;
    unencapsulating a second IPv6 packet from the second IPv4 packet in response to detecting that the source port field specifies the prescribed UDP port for the IPv6 gateway;

detecting a second IPv6 tag address within a destination address field of the second IPv6 packet that specifies:

(1) a second IPv4 address, within the corresponding mobile node address field, that specifies a public IPv4 address distinct from the mobile node IPv4 address, (2) a public UDP port within the corresponding mobile node port field and distinct from the prescribed UDP port for the IPv6 mobile node, and (3) the prescribed protocol identifer, followed by the IPv4 gateway address within the corresponding gateway address field, at a beginning of the destination address field;

overwriting the second IPv4 address in the mobile node address field of the second IPv6 tag address with the mobile node IPv4 address;

overwriting the public UDP port in the mobile node port field of the second IPv6 tag address with the prescribed UDP port for the IPv6 mobile node; and processing the second IPv6 packet based on a determined match between the modified second IPv6 tag address and the IPv6 tag address.

9. The method of claim 8, further including selectively source routing the second IPv6 packet in a second IPv6 network based on detecting a type 2 routing header specifying another destination.

10. The method of claim 9, wherein the outputting and receiving steps include outputting and receiving the respective IPv4 packet and the second IPv4 packet via a network address translator (NAT) having a port address translator (PAT).

11. The method of claim 7, wherein the IPv4 gateway address is a public address stored in a gateway address field of the IPv6 tag address, the prescribed UDP port for the IPv6 gateway is a public port stored in a gateway port field of the IPv6 tag address, the mobile node IPv4 address is a private address stored in a mobile node address field of the IPv6 tag address, and the prescribed UDP port for the IPv6 mobile node is a private port stored in a mobile node port field of the IPv6 tag address, the method further including:

receiving from the IPv4 network a second IPv4 packet having a source address field specifying the IPv4 gateway address, a source port field specifying the prescribed UDP port for the IPv6 gateway, a destination address field specifying the mobile node IPv4 address, and a destination port field specifying the prescribed UDP port for the IPv6 mobile node;

unencapsulating a second IPv6 packet from the second IPv4 packet in response to detecting that the source port field specifies the prescribed UDP port for the IPv6 gateway;

detecting a second IPv6 tag address within a destination address field of the second IPv6 packet that specifies:

(1) a second IPv4 address, within the corresponding mobile node address field, that specifies a public IPv4 address distinct from the mobile node IPv4 address, (2) a public UDP port within the corresponding mobile node port field and distinct from the prescribed UDP port for the IPv6 mobile node, (3) the prescribed protocol identifer, followed by a private IPv4 address within the corresponding gateway address field and distinct from the IPv4 gateway address, at a beginning of the destination address field, and (4) a private UDP port within an IPv6 gateway port field and distinct from the prescribed port for the IPv6 gateway;

overwriting the second IPv4 address in the mobile node address field and the private IPv4 address in the gateway address field of the second IPv6 tag address with the mobile node IPv4 address and the IPv4 gateway address specified in a header of the second IPv4 packet, respectively;

overwriting the public UDP port in the mobile node port field and the private UDP port in the IPv6 gateway port field of the second IPv6 tag address with the prescribed UDP port for the IPv6 mobile node and the prescribed port for the IPv6 gateway specified in the header of the second IPv4 packet, respectively; and processing the second IPv6 packet based on a determined match between the modified second IPv6 tag address and the IPv6 tag address.

12. A method in an IPv6 router, the method including:

attaching to an IPv4 network using an IPv4 gateway address and an IPv6 network using an IPv6 address;

receiving from the IPv4 network an IPv4 packet having a destination address field specifying the IPv4 gateway address, a destination port field specifying a prescribed UDP gateway port, a source address field specifying an IPv4 address and a source port field specifying a second UDP port;

recovering an IPv6 packet from the IPv4 packet in response to detecting the prescribed UDP gateway port in the destination port field;

detecting within a source address field of the IPv6 packet an IPv6 tag address starting with a prescribed protocol identifier for an IPv6 gateway to transfer the IPv6 packet between the IPv4 network and the IPv6 network, the IPv6 tag address further including a second IPv4 address distinct from the IPv4 address;

modifying the IPv6 tag address into a modified IPv6 tag address, in response to detecting the prescribed protocol identifer, by overwriting the second IPv4 address with the IPv4 address and inserting the second UDP port into the IPv6 tag address;

updating the IPv6 packet into an updated IPv6 packet by inserting the modified IPv6 tag address into the source address field of the IPv6 packet; and outputting the updated IPv6 packet onto the IPv6 network.

13. The method of claim 12, wherein the modifying further includes:

detecting the prescribed protocol identifier at a start of the IPv6 tag address based on the first sixteen bits having a hexadecimal value of "2002";

the inserting of the second UDP port overwriting a detected source UDP port value in the IPv6 tag address.

14. The method of claim 13, wherein the IPv6 router is configured for routing a second received IPv6 packet, received from the IPv6 network and having an IPv6 destination address field specifying the modified IPv6 address, onto the IPv4 network in response to detecting the protocol identifier in the IPv6 destination address field.

15. The method of claim 14, wherein the prescribed UDP gateway port has a UDP value of "434" specifying mobile IP.

16. The method of claim 15, wherein the IPv6 tag address includes a private UDP source port, the second IPv4 address in the IPv6 tag address specifying a private IP address, the source address field and the source port field of the IPv4 packet having been translated to the respective IPv4 address and the second UDP port by a network address translator (NAT) having a port address translator (PAT).

17. The method of claim 16, further comprising:
receiving via the IPv6 network a second IPv6 packet having a routing header that specifies the modified IPv6 tag address;
detecting the second protocol identifier, the IPv4 address and the second UDP port in the modified IPv6 tag address of the second IPv6 packet;
modifying the second IPv6 packet into a forwarded IPv6 packet by inserting the modified IPv6 tag address into the destination address field of the second IPv6 packet;
encapsulating the forwarded IPv6 packet in a second IPv4 packet having a destination address field specifying the IPv4 address and a port field specifying the second UDP port; and
outputting the second IPv4 packet onto the IPv4 network.

18. The method of claim 16, wherein the IPv4 gateway address is a private address and the prescribed UDP gateway port is a private port, the destination address field and the destination port field having been translated by a second NAT having a PAT, the modifying including overwriting a public IPv4 gateway address and a public UDP gateway port in the IPv6 tag address with the prescribed UDP gateway port and the IPv4 gateway address, respectively.

19. An IPv6 mobile node comprising:
means for first generating an IPv6 tag address that includes a prescribed protocol identifier for an IPv6 gateway configured for transferring packets between an IPv4 network and an IPv6 network, and an IPv4 gateway address for the IPv6 gateway;
means for second generating an IPv6 packet having a source address field that specifies the IPv6 tag address, and a header that specifies a home address assigned to the IPv6 mobile node;
means for encapsulating the IPv6 packet in an IPv4 packet having an IPv4 header including a destination address field that specifies the IPv4 gateway address, a source address field specifying a mobile node IPv4 address for the IPv6 mobile node, and a transport header having a source port field specifying a prescribed UDP port for the IPv6 mobile node, and a destination port field specifying a prescribed UDP port for the IPv6 gateway used for identifying transfer of the IPv6 packet between the IPv4 network and the IPv6 network; and
means for outputting the IPv4 packet to the IPv6 gateway via the IPv4 network, for transfer of the IPv6 packet onto the IPv6 network.

20. The IPv6 mobile node of claim 19, wherein the first generating means is configured for:
specifying the prescribed protocol identifier at a beginning of the IPv6 tag address, contiguously followed by the IPv4 gateway address;
inserting a Site-Level Aggregation Identifier (SLA) contiguously following the IPv4 gateway address, wherein the prescribed protocol identifer, the IPv4 gateway address, and the SLA form an address prefix for the IPv6 gateway; and
inserting the mobile node IPv4 address in the IPv6 tag address.

21. The IPv6 mobile node of claim 20, wherein the first generating means is configured for:
inserting the prescribed UDP port for the IPv6 gateway contiguously following the SLA; and
inserting the prescribed UDP port for the IPv6 mobile node contiguously following the mobile node IPv4 address, the mobile node IPv4 address and the prescribed UDP port forming an address suffix for identifying the IPv6 mobile node, the IPv6 tag address being a routable IPv6 address.

22. The IPv6 mobile node of claim 21, wherein the IPv6 mobile node has a prescribed home agent having a corresponding home agent address, the second generating means configured for specifying the home agent address within a destination address field of the IPv6 packet.

23. The IPv6 mobile node of claim 22, wherein the second generating means is configured for adding a binding update within the IPv6 packet for the prescribed home agent based on the IPv6 mobile node having attached to the IPv4 network, the IPv6 tag address being identifiable as a care-of address for the IPv6 mobile node.

24. The IPv6 mobile node of claim 23, wherein the prescribed protocol identifier is a sixteen-bit prefix having a hexadecimal value of "2002".

25. The IPv6 mobile node of claim 19, wherein the first generating means is configured for inserting within the IPv6 tag address the prescribed UDP port for the IPv6 gateway.

26. The IPv6 mobile node of claim 25, wherein the IPv4 gateway address is a public address stored in a gateway address field of the IPv6 tag address, the prescribed UDP port for the IPv6 gateway is a public port stored in a gateway port field of the IPv6 tag address, the mobile node IPv4 address is a private address stored in a mobile node address field of the IPv6 tag address, and the prescribed UDP port for the IPv6 mobile node is a private port stored in a mobile node port field of the IPv6 tag address, wherein:
the means for outputting is configured for receiving from the IPv4 network a second IPv4 packet having a source address field specifying the IPv4 gateway address, a source port field specifying the prescribed UDP port for the IPv6 gateway, a destination address field specifying the mobile node IPv4 address, and a destination port field specifying the prescribed UDP port for the IPv6 mobile node;
the encapsulating means is configured for unencapsulating a second IPv6 packet from the second IPv4 packet in response to detecting that the source port field specifies the prescribed UDP port for the IPv6 gateway;
the encapsulating means configured for detecting a second IPv6 tag address within a destination address field of the second IPv6 packet that specifies:
(1) a second IPv4 address, within the corresponding mobile node address field, that specifies a public IPv4 address distinct from the mobile node IPv4 address,
(2) a public UDP port within the corresponding mobile node port field and distinct from the prescribed UDP port for the IPv6 mobile node, and
(3) the prescribed protocol identifer, followed by the IPv4 gateway address within the corresponding gateway address field, at a beginning of the destination address field;
the encapsulating means configured for overwriting the second IPv4 address in the mobile node address field of the second IPv6 tag address with the mobile node IPv4 address;
the encapsulating means configured for overwriting the public UDP port in the mobile node port field of the second IPv6 tag address with the prescribed UDP port for the IPv6 mobile node; and
the second generating means configured for processing the second IPv6 packet based on a determined match between the modified second IPv6 tag address and the IPv6 tag address.

27. The IPv6 mobile node of claim 26, wherein the second generating means is configured for selectively source routing the second IPv6 packet in a second IPv6 network based on detecting a type 2 routing header specifying another destination.

28. The IPv6 mobile node of claim 27, wherein the outputting means is configured for outputting and receiving the respective IPv4 packet and the second IPv4 packet via a network address translator (NAT) having a port address translator (PAT).

29. The IPv6 mobile node of claim 25, wherein the IPv4 gateway address is a public address stored in a gateway address field of the IPv6 tag address, the prescribed UDP port for the IPv6 gateway is a public port stored in a gateway port field of the IPv6 tag address, the mobile node IPv4 address is a private address stored in a mobile node address field of the IPv6 tag address, and the prescribed UDP port for the IPv6 mobile node is a private port stored in a mobile node port field of the IPv6 tag address, wherein:

the means for outputting is configured for receiving from the IPv4 network a second IPv4 packet having a source address field specifying the IPv4 gateway address, a source port field specifying the prescribed UDP port for the IPv6 gateway, a destination address field specifying the mobile node IPv4 address, and a destination port field specifying the prescribed UDP port for the IPv6 mobile node;

the encapsulating means configured for unencapsulating a second IPv6 packet from the second IPv4 packet in response to detecting that the source port field specifies the prescribed UDP port for the IPv6 gateway;

the encapsulating means configured for detecting a second IPv6 tag address within a destination address field of the second IPv6 packet that specifies:

(1) a second IPv4 address, within the corresponding mobile node address field, that specifies a public IPv4 address distinct from the mobile node IPv4 address, (2) a public UDP port within the corresponding mobile node port field and distinct from the prescribed UDP port for the IPv6 mobile node, (3) the prescribed protocol identifer, followed by a private IPv4 address within the corresponding gateway address field and distinct from the IPv4 gateway address, at a beginning of the destination address field, and (4) a private UDP port within an IPv6 gateway port field and distinct from the prescribed port for the IPv6 gateway;

the encapsulating means configured for overwriting the second IPv4 address in the mobile node address field and the private IPv4 address in the gateway address field of the second IPv6 tag address with the mobile node IPv4 address and the IPv4 gateway address specified in a header of the second IPv4 packet, respectively;

the encapsulating means configured for overwriting the public UDP port in the mobile node port field and the private UDP port in the IPv6 gateway port field of the second IPv6 tag address with the prescribed UDP port for the IPv6 mobile node and the prescribed port for the IPv6 gateway specified in the header of the second IPv4 packet, respectively; and the second generating means configured for processing the second IPv6 packet based on a determined match between the modified second IPv6 tag address and the IPv6 tag address.

30. An IPv6 router including:

means for attaching to an IPv4 network using an IPv4 gateway address and an IPv6 network using an IPv6 address;

means for receiving from the IPv4 network an IPv4 packet having a destination address field specifying the IPv4 gateway address, a destination port field specifying a prescribed UDP gateway port, a source address field specifying an IPv4 address and a source port field specifying a second UDP port;

means for recovering an IPv6 packet from the IPv4 packet in response to detecting the prescribed UDP gateway port in the destination port field;

means for detecting within a source address field of the IPv6 packet an IPv6 tag address starting with a prescribed protocol identifier for an IPv6 gateway to transfer the IPv6 packet between the IPv4 network and the IPv6 network, the IPv6 tag address further including a second IPv4 address distinct from the IPv4 address;

means for modifying the IPv6 tag address into a modified IPv6 tag address, in response to detecting the prescribed protocol identifer, by overwriting the second IPv4 address with the IPv4 address and inserting the second UDP port into the IPv6 tag address;

means for updating the IPv6 packet into an updated IPv6 packet by inserting the modified IPv6 tag address into the source address field of the IPv6 packet; and means for outputting the updated IPv6 packet onto the IPv6 network.

31. The IPv6 router of claim 30, wherein the modifying means is configured for:

detecting the prescribed protocol identifier at a start of the IPv6 tag address based on the first sixteen bits having a hexadecimal value of "2002";

the inserting of the second UDP port overwriting a detected source UDP port value in the IPv6 tag address.

32. The IPv6 router of claim 31, wherein the IPv6 router is configured for routing a second received IPv6 packet, received from the IPv6 network and having an IPv6 destination address field specifying the modified IPv6 address, onto the IPv4 network in response to detecting the protocol identifier in the IPv6 destination address field.

33. The IPv6 router of claim 30, wherein the prescribed UDP gateway port has a UDP value of "434" specifying mobile IP.

34. The IPv6 router of claim 33, wherein the IPv6 tag address includes a private UDP source port, the second IPv4 address in the IPv6 tag address specifying a private IP address, the source address field and the source port field of the IPv4 packet having been translated to the respective IPv4 address and the second UDP port by a network address translator (NAT) having a port address translator (PAT).

35. The IPv6 router of claim 34, wherein:

the outputting means is configured for receiving via the IPv6 network a second IPv6 packet having a routing header that specifies the modified IPv6 tag address;

the detecting means is configured for detecting the second protocol identifier, the IPv4 address and the second UDP port in the modified IPv6 tag address of the second IPv6 packet;

the modifying means is configured for modifying the second IPv6 packet into a forwarded IPv6 packet by inserting the modified IPv6 tag address into the destination address field of the second IPv6 packet;

the recovering means is configured for encapsulating the forwarded IPv6 packet in a second IPv4 packet having a destination address field specifying the IPv4 address and a port field specifying the second UDP port; and the receiving means is configured for outputting the second IPv4 packet onto the IPv4 network.

36. The IPv6 router of claim 34, wherein the IPv4 gateway address is a private address and the prescribed UDP gateway port is a private port, the destination address field and the destination port field having been translated by a second NAT having a PAT, the modifying means configured for overwriting a public IPv4 gateway address and a public UDP gateway port in the IPv6 tag address with the prescribed UDP gateway port and the IPv4 gateway address, respectively.

37. A computer readable medium having stored thereon sequences of instructions for outputting an IPv4 packet by an IPv6 mobile node, the sequences of instructions including instructions for:

first generating an IPv6 tag address that includes a prescribed protocol identifier for an IPv6 gateway configured for transferring packets between an IPv4 network and an IPv6 network, and an IPv4 gateway address for the IPv6 gateway;

second generating an IPv6 packet having a source address field that specifies the IPv6 tag address, and a header that specifies a home address assigned to the IPv6 mobile node;

encapsulating the IPv6 packet in an IPv4 packet having an IPv4 header including a destination address field that specifies the IPv4 gateway address, a source address field specifying a mobile node IPv4 address for the IPv6 mobile node, and a transport header having a source port field specifying a prescribed UDP port for the IPv6 mobile node, and a destination port field specifying a prescribed UDP port for the IPv6 gateway used for identifying transfer of the IPv6 packet between the IPv4 network and the IPv6 network; and outputting the IPv4 packet to the IPv6 gateway via the IPv4 network, for transfer of the IPv6 packet onto the IPv6 network.

38. The medium of claim 37, wherein the first generating step includes:

specifying the prescribed protocol identifier at a beginning of the IPv6 tag address, contiguously followed by the IPv4 gateway address;

inserting a Site-Level Aggregation Identifier (SLA) contiguously following the IPv4 gateway address, wherein the prescribed protocol identifer, the IPv4 gateway address, and the SLA form an address prefix for the IPv6 gateway; and inserting the mobile node IPv4 address in the IPv6 tag address.

39. The medium of claim 38, wherein the first generating step further includes:

inserting the prescribed UDP port for the IPv6 gateway contiguously following the SLA; and inserting the prescribed UDP port for the IPv6 mobile node contiguously following the mobile node IPv4 address, the mobile node IPv4 address and the prescribed UDP port forming an address suffix for identifying the IPv6 mobile node, the IPv6 tag address being a routable IPv6 address.

40. The medium of claim 39, wherein the IPv6 mobile node has a prescribed home agent having a corresponding home agent address, the second generating step including specifying the home agent address within a destination address field of the IPv6 packet.

41. The medium of claim 40, wherein the second generating step includes adding a binding update within the IPv6 packet for the prescribed home agent based on the IPv6 mobile node having attached to the IPv4 network, the IPv6 tag address being identifiable as a care-of address for the IPv6 mobile node.

42. The medium of claim 41, wherein the prescribed protocol identifier is a sixteen-bit prefix having a hexadecimal value of "2002".

43. The medium of claim 37, wherein the first generating includes inserting within the IPv6 tag address the prescribed UDP port for the IPv6 gateway.

44. The medium of claim 43, wherein the IPv4 gateway address is a public address stored in a gateway address field of the IPv6 tag address, the prescribed UDP port for the IPv6 gateway is a public port stored in a gateway port field of the IPv6 tag address, the mobile node IPv4 address is a private address stored in a mobile node address field of the IPv6 tag address, and the prescribed UDP port for the IPv6 mobile node is a private port stored in a mobile node port field of the IPv6 tag address, the medium further including instructions for:

receiving from the IPv4 network a second IPv4 packet having a source address field specifying the IPv4 gateway address, a source port field specifying the prescribed UDP port for the IPv6 gateway, a destination address field specifying the mobile node IPv4 address, and a destination port field specifying the prescribed UDP port for the IPv6 mobile node;

unencapsulating a second IPv6 packet from the second IPv4 packet in response to detecting that the source port field specifies the prescribed UDP port for the IPv6 gateway;

detecting a second IPv6 tag address within a destination address field of the second IPv6 packet that specifies:

(1) a second IPv4 address, within the corresponding mobile node address field, that specifies a public IPv4 address distinct from the mobile node IPv4 address, (2) a public UDP port within the corresponding mobile node port field and distinct from the prescribed UDP port for the IPv6 mobile node, and (3) the prescribed protocol identifer, followed by the IPv4 gateway address within the corresponding gateway address field, at a beginning of the destination address field;

overwriting the second IPv4 address in the mobile node address field of the second IPv6 tag address with the mobile node IPv4 address;

overwriting the public UDP port in the mobile node port field of the second IPv6 tag address with the prescribed UDP port for the IPv6 mobile node; and processing the second IPv6 packet based on a determined match between the modified second IPv6 tag address and the IPv6 tag address.

45. The medium of claim 44, further including instructions for selectively source routing the second IPv6 packet in a second IPv6 network based on detecting a type 2 routing header specifying another destination.

46. The medium of claim 45, wherein the outputting and receiving steps include outputting and receiving the respective IPv4 packet and the second IPv4 packet via a network address translator (NAT) having a port address translator (PAT).

47. The medium of claim 43, wherein the IPv4 gateway address is a public address stored in a gateway address field of the IPv6 tag address, the prescribed UDP port for the IPv6 gateway is a public port stored in a gateway port field of the IPv6 tag address, the mobile node IPv4 address is a private address stored in a mobile node address field of the IPv6 tag address, and the prescribed UDP port for the IPv6 mobile node is a private port stored in a mobile node port field of the IPv6 tag address, the medium further including instructions for:

receiving from the IPv4 network a second IPv4 packet having a source address field specifying the IPv4 gateway address, a source port field specifying the prescribed UDP port for the IPv6 gateway, a destination address field specifying the mobile node IPv4 address, and a destination port field specifying the prescribed UDP port for the IPv6 mobile node;

unencapsulating a second IPv6 packet from the second IPv4 packet in response to detecting that the source port field specifies the prescribed UDP port for the IPv6 gateway;

detecting a second IPv6 tag address within a destination address field of the second IPv6 packet that specifies:
(1) a second IPv4 address, within the corresponding mobile node address field, that specifies a public IPv4 address distinct from the mobile node IPv4 address,
(2) a public UDP port within the corresponding mobile node port field and distinct from the prescribed UDP port for the IPv6 mobile node,
(3) the prescribed protocol identifer, followed by a private IPv4 address within the corresponding gateway address field and distinct from the IPv4 gateway address, at a beginning of the destination address field, and
(4) a private UDP port within an IPv6 gateway port field and distinct from the prescribed port for the IPv6 gateway;

overwriting the second IPv4 address in the mobile node address field and the private IPv4 address in the gateway address field of the second IPv6 tag address with the mobile node IPv4 address and the IPv4 gateway address specified in a header of the second IPv4 packet, respectively;

overwriting the public UDP port in the mobile node port field and the private UDP port in the IPv6 gateway port field of the second IPv6 tag address with the prescribed UDP port for the IPv6 mobile node and the prescribed port for the IPv6 gateway specified in the header of the second IPv4 packet, respectively; and processing the second IPv6 packet based on a determined match between the modified second IPv6 tag address and the IPv6 tag address.

48. A computer readable medium having stored thereon sequences of instructions for receiving an IPv4 packet by an IPv6 router, the sequences of instructions including instructions for:

attaching to an IPv4 network using an IPv4 gateway address and an IPv6 network using an IPv6 address;

receiving from the IPv4 network an IPv4 packet having a destination address field specifying the IPv4 gateway address, a destination port field specifying a prescribed UDP gateway port, a source address field specifying an IPv4 address and a source port field specifying a second UDP port;

recovering an IPv6 packet from the IPv4 packet in response to detecting the prescribed UDP gateway port in the destination port field;

detecting within a source address field of the IPv6 packet an IPv6 tag address starting with a prescribed protocol identifier for an IPv6 gateway to transfer the IPv6 packet between the IPv4 network and the IPv6 network, the IPv6 tag address further including a second IPv4 address distinct from the IPv4 address;

modifying the IPv6 tag address into a modified IPv6 tag address, in response to detecting the prescribed protocol identifer, by overwriting the second IPv4 address with the IPv4 address and inserting the second UDP port into the IPv6 tag address;

updating the IPv6 packet into an updated IPv6 packet by inserting the modified IPv6 tag address into the source address field of the IPv6 packet; and outputting the updated IPv6 packet onto the IPv6 network.

49. The medium of claim 48, wherein the modifying further includes:

detecting the prescribed protocol identifier at a start of the IPv6 tag address based on the first sixteen bits having a hexadecimal value of "2002";

the inserting of the second UDP port overwriting a detected source UDP port value in the IPv6 tag address.

50. The medium of claim 49, further including instructions causing the IPv6 router to route a second received IPv6 packet, received from the IPv6 network and having an IPv6 destination address field specifying the modified IPv6 address, onto the IPv4 network in response to detecting the protocol identifier in the IPv6 destination address field.

51. The medium of claim 48, wherein the prescribed UDP gateway port has a UDP value of "434" specifying mobile IP.

52. The medium of claim 51, wherein the IPv6 tag address includes a private UDP source port, the second IPv4 address in the IPv6 tag address specifying a private IP address, the source address field and the source port field of the IPv4 packet having been translated to the respective IPv4 address and the second UDP port by a network address translator (NAT) having a port address translator (PAT).

53. The medium of claim 52, further comprising instructions for:

receiving via the IPv6 network a second IPv6 packet having a routing header that specifies the modified IPv6 tag address;

detecting the second protocol identifier, the IPv4 address and the second UDP port in the modified IPv6 tag address;

modifying the IPv6 packet into a forwarded IPv6 packet by inserting the modified IPv6 tag address into the destination address field of the IPv6 packet;

encapsulating the forwarded IPv6 packet in a second IPv4 packet having a destination address field specifying the IPv4 address and a port field specifying the second UDP port; and outputting the second IPv4 packet onto the IPv4 network.

54. The medium of claim 52, wherein the IPv4 gateway address is a private address and the prescribed UDP gateway port is a private port, the destination address field and the destination port field having been translated by a second NAT having a PAT, the modifying including overwriting a public IPv4 gateway address and a public UDP gateway port in the IPv6 tag address with the prescribed UDP gateway port and the IPv4 gateway address, respectively.

* * * * *